United States Patent
Lui

(10) Patent No.: US 10,628,915 B1
(45) Date of Patent: Apr. 21, 2020

(54) MULTI-MODAL WARP FILTER TO REDUCE MEMORY BANDWIDTH

(71) Applicant: Ambarella International LP, Santa Clara, CA (US)

(72) Inventor: Beng-Han Lui, Santa Clara, CA (US)

(73) Assignee: Ambarella International LP, Santa Clara, CA (US)

(*) Notice: Subject to any disclaimer, the term of this patent is extended or adjusted under 35 U.S.C. 154(b) by 335 days.

(21) Appl. No.: 15/405,456

(22) Filed: Jan. 13, 2017

(51) Int. Cl.
*G06K 9/40* (2006.01)
*G06T 1/60* (2006.01)
*G06T 3/00* (2006.01)

(52) U.S. Cl.
CPC .............. *G06T 1/60* (2013.01); *G06T 3/0093* (2013.01)

(58) Field of Classification Search
None
See application file for complete search history.

(56) References Cited

U.S. PATENT DOCUMENTS

| | | | | |
|---|---|---|---|---|
| 2003/0086007 A1* | 5/2003 | Sasai | ..................... | G06T 3/0093 348/240.2 |
| 2014/0015853 A1* | 1/2014 | Ostrovsky | .............. | G09G 5/397 345/619 |
| 2015/0279311 A1* | 10/2015 | Izumi | ................. | H04N 21/2343 345/660 |
| 2018/0150943 A1* | 5/2018 | Gur | ......................... | G06T 5/006 |

* cited by examiner

*Primary Examiner* — Sean M Conner
(74) *Attorney, Agent, or Firm* — Christopher P. Maiorana, PC

(57) ABSTRACT

An apparatus includes a memory and a circuit. The memory may be configured to store data. The circuit may be configured to (i) analyze a warp field to determine a current mode of a plurality of read modes that reduces a memory bandwidth, (ii) read one or more rectangular regions of an input image containing data from the memory based on the current mode, and (iii) generate an output image by filtering the data received from the memory with a warp field.

20 Claims, 11 Drawing Sheets

MULTI-MODAL WARP FILTER TO REDUCE MEMORY BANDWIDTH

FIELD OF THE INVENTION

The invention relates to warp filtering generally and, more particularly, to a method and/or apparatus for implementing a multi-modal warp filter to reduce memory bandwidth.

BACKGROUND

A memory subsystem in a conventional computer vision system is shared by multiple clients, and thus has a limited data bandwidth. A request bandwidth of the memory subsystem is usually more limited than the data bandwidth because the data can be served by multiple channels whereas the requests are served by only a single channel. A warp filter supporting arbitrary warp fields will inevitably encounter cases where memory access is inefficient. Either the warp filter supports only a restricted warp field and a cap of the memory bandwidth can be derived from the restriction, or a generic warp filter wastes the memory bandwidth.

It would be desirable to implement a multi-modal warp filter to reduce memory bandwidth.

SUMMARY

The invention concerns an apparatus including a memory and a circuit. The memory may be configured to store data. The circuit may be configured to (i) analyze a warp field to determine a current mode of a plurality of read modes that reduces a memory bandwidth, (ii) read one or more rectangular regions of an input image containing data from the memory based on the current mode, and (iii) generate an output image by filtering the data received from the memory with a warp field.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a multi-modal warp filter to reduce memory bandwidth that may (i) reduce a request bandwidth, (ii) implement multiple types of read requests, (iii) implement multiple types of access modes, (iv) access multiple blocks per read request and/or (v) be implemented as one or more integrated circuits.

A shared memory in a computer vision system is generally shared by multiple clients. The shared memory may have a significant data bandwidth to service the clients simultaneously. A request bandwidth of the shared memory may be limited relative to the data bandwidth. The data bandwidth may be served through the multiple data channels, but access requests may be served by as few as a single channel to an arbiter. Techniques of the invention may prioritize and reduce (or minimize) a number of the access requests to the arbiter to reduce the memory bandwidth where possible.

Figure 1:
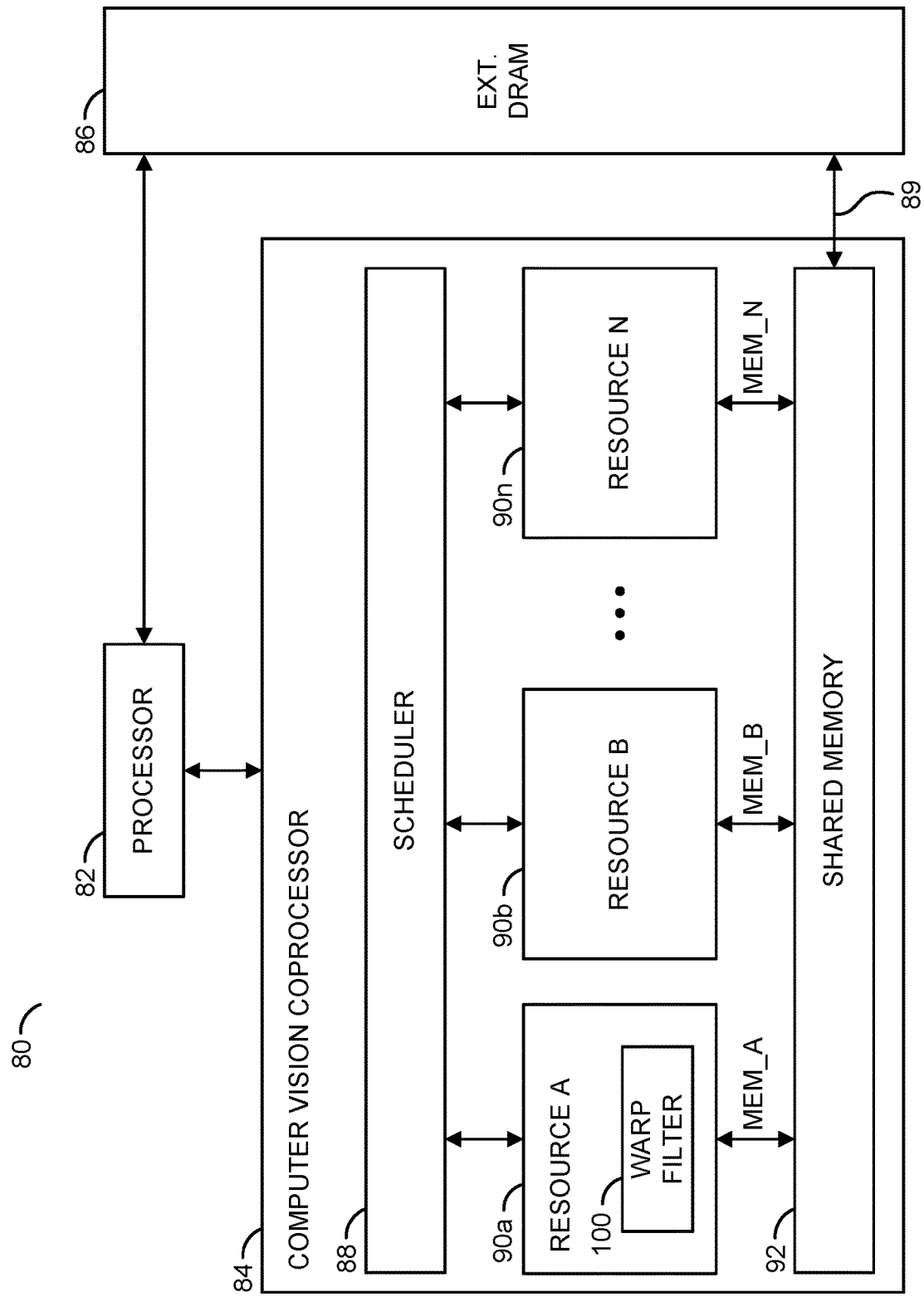
FIG. 1 is a diagram of a system.

Referring to FIG. 1, a diagram of a system 80 is shown illustrating a context in which a warp filter operation may be implemented in accordance with an example embodiment of the invention. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like.

In an example embodiment, the system 80 comprises a block (or circuit) 82, a block (or circuit) 84, and a block (or circuit) 86. The circuit 84 generally comprises a block (or circuit) 88, a bus 89, one or more blocks (or circuits) 90a-90n, and a block (or circuit) 92. One or more of the circuits 90a-90n (e.g., circuit 90a as shown) generally comprises a block (or circuit) 100. In various embodiments, the circuit 100 may be configured to implement and/or perform multi-modal warp filtering in accordance with an example embodiment of the invention.

The circuit 82 may implement a processor circuit. In some embodiments, the processor circuit 82 may be a general purpose processor circuit. The processor circuit 82 may be operational to interact with the circuit 84 and the circuit 86 to perform various computer vision tasks.

The circuit 84 may implement a coprocessor circuit. In some embodiments, the coprocessor circuit 84 may be computer vision coprocessor circuit 84. The coprocessor circuit 84 is generally operational to perform specific computer vision tasks as arranged by the processor circuit 82.

The circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 88 may implement a scheduler circuit. The scheduler circuit 88 is generally operational to schedule tasks among the circuits 90a-90n to perform a variety of computer vision tasks as defined by the processor circuit 82. Individual tasks may be allocated by the scheduler circuit 88 to the circuits 90a-90n.

Each circuit 90a-90n may implement a processing resource (or engine). The resource circuits 90a-90n are generally operational to perform specific processing tasks. In some configurations, the resource circuits 90a-90n may operate in parallel and independent of each other. In other configurations, the resource circuits 90a-90n may operate collectively among each other to perform allocated tasks. The resource circuits 90a-90n may be homogenous processing resources (all circuits 90a-90n may have the same capabilities) or heterogeneous processing resources (two or more circuits 90a-90n may have different capabilities). In various embodiments, the resource circuits 90a-90n may be implemented solely as hardware circuits.

The circuit 92 may implement a shared memory circuit. The memory circuit 92 is generally operational to store portions of the multidimensional arrays of input data elements and output data elements generated by the resource circuits 90a-90n. The input data elements may be received from the DRAM circuit 86 via a memory bus 89. The output data elements may be sent to the DRAM circuit 86 via the memory bus 89.

The circuit 100 may implement a warp filter in accordance with an example embodiment of the invention. The warp filter 100 is generally operational to get a warp field from the memory circuit 92, analyze the warp field to determine a current mode of a plurality of read modes, and read one or more rectangular regions of an input image containing data elements from the memory circuit 92 based on the current mode. The read data elements may be stored among several buffers in the warp filter 100 based on the current mode. An output image may be subsequently generated by the warp filter 100 by interpolation filtering the data elements in the buffers with a warp field.

Figure 2:
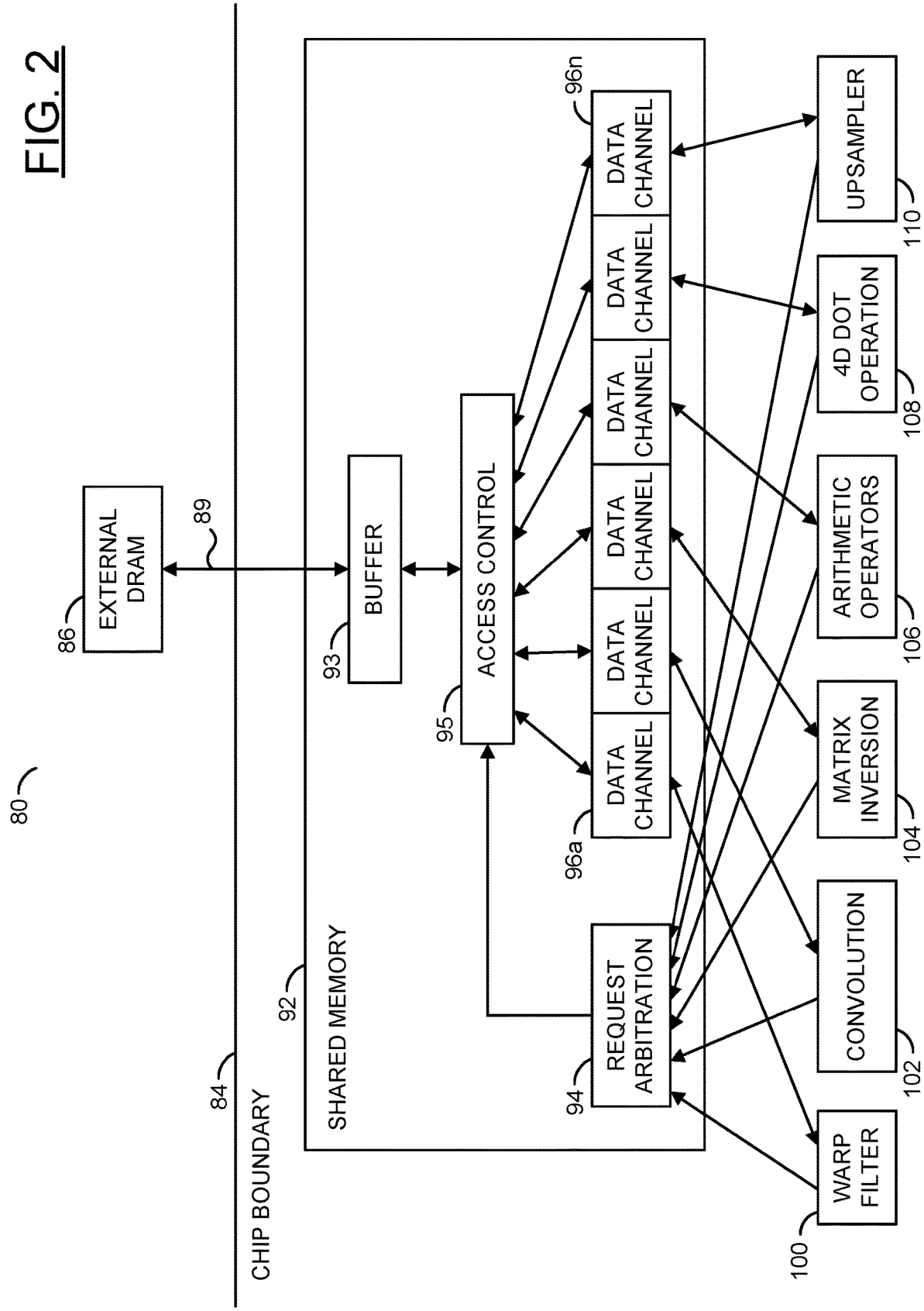
FIG. 2 is a block diagram of a portion of the system.

Referring to FIG. 2, a block diagram of an example implementation of a portion of the system 80 is shown. The shared memory 92 generally comprises a block (or circuit) 93, a block (or circuit) 94, a block (or circuit) 95, and multiple blocks (or channels) 96a-96n. The resources 90b-90n may include multiple blocks (or circuits) 102-110. The circuit 93 may communicate with the memory 86 via the memory bus 89. The circuit 93 may also communicate with the circuit 95. The circuit 94 may communicate with the circuit 95. The circuit 94 may also communicate with the circuits 100-110 via the signals MEM_A to MEM_N. The circuit 95 may communicate with the channels 96a-96n. The channels 96a-96n may communicate with the circuits 100-110 via the signals MEM_A to MEM_N.

The circuit 93 may implement a buffer circuit. The buffer 93 may be operational to temporarily store data, commands and other information being transferred between the memory 92 and the memory 86. The buffer 93 may communicate with the memory 86 across the memory bus 89.

The circuit 94 may implement an arbitration circuit (or arbiter for short). The arbiter 94 is generally operational to arbitrate among the circuits 100-110 for access to the buffer 93. A winner of the arbitration may exchange data with the buffer 93 through a corresponding one of the channels 96a-96n.

The circuit 95 may implement an access control circuit. The circuit 95 is generally operational to control the flow of data between the buffer 93 and the channels 96a-96n. The control may be based on the arbitration results provided by the arbiter 94.

Each channel 96a-96n may implement a data channel. The data channels 96a-96n are generally operational to transfer data between the buffer 93 and a corresponding one of the circuits 100-110. Each data channel 96a-96n may also be operational to buffer a small amount of data at any given time. The data channels 96a-96n may operate simultaneously (or in parallel) to move the data.

The circuit 102 may implement a convolution circuit. The convolution circuit 102 is generally operational to convolute multidimensional arrays of data. In some embodiments, the convolution circuit 102 may be part of one or more of the resource circuits 90a-90n (e.g., 90b). Input arrays may be received from the memory 92. Output arrays may be stored back to the memory 92.

The circuit 104 may implement a matrix inversion circuit. The matrix inversion circuit 104 is generally operational to perform matrix inversions. In some embodiments, the matrix inversion circuit 104 may be part of one or more of the resource circuits 90a-90n (e.g., 90c). Input matrices may be received from the memory 92, inverted, and subsequently stored in the memory 92.

The circuit 106 may implement an arithmetic circuit. The arithmetic circuit 106 is generally operational to perform a variety of arithmetic operations on data received from the memory 92. In some embodiments, the arithmetic circuit 106 may be part of one or more of the resource circuits 90a-90n (e.g., 90d). Upon completion of the arithmetic operations, the resulting data may be stored in the memory 92.

The circuit 108 may implement a multidimensional dot product circuit. The dot product circuit 108 is generally operational to perform multidimensional (e.g., four-dimensional (4D)) dot product matrix operations. In various embodiments, the dot product circuit 108 may be implemented in one or more of the resources 90a-90n (e.g., 90e). Input vectors for the multidimensional operations may be received from the memory 92. Results of the dot product matrix operations may be stored in the memory 92.

The circuit 110 may implement an upsampler circuit. The upsampler circuit 110 is generally operational to upsample (or interpolate) multidimensional (e.g., two dimensional) arrays. In some embodiments, the upsampler circuit 110 may be implemented in one or more of the resource circuits 90a-90n (e.g., 90f). The input arrays may be read from the memory 92, upsampled, and returned to the memory 92.

Figure 3:
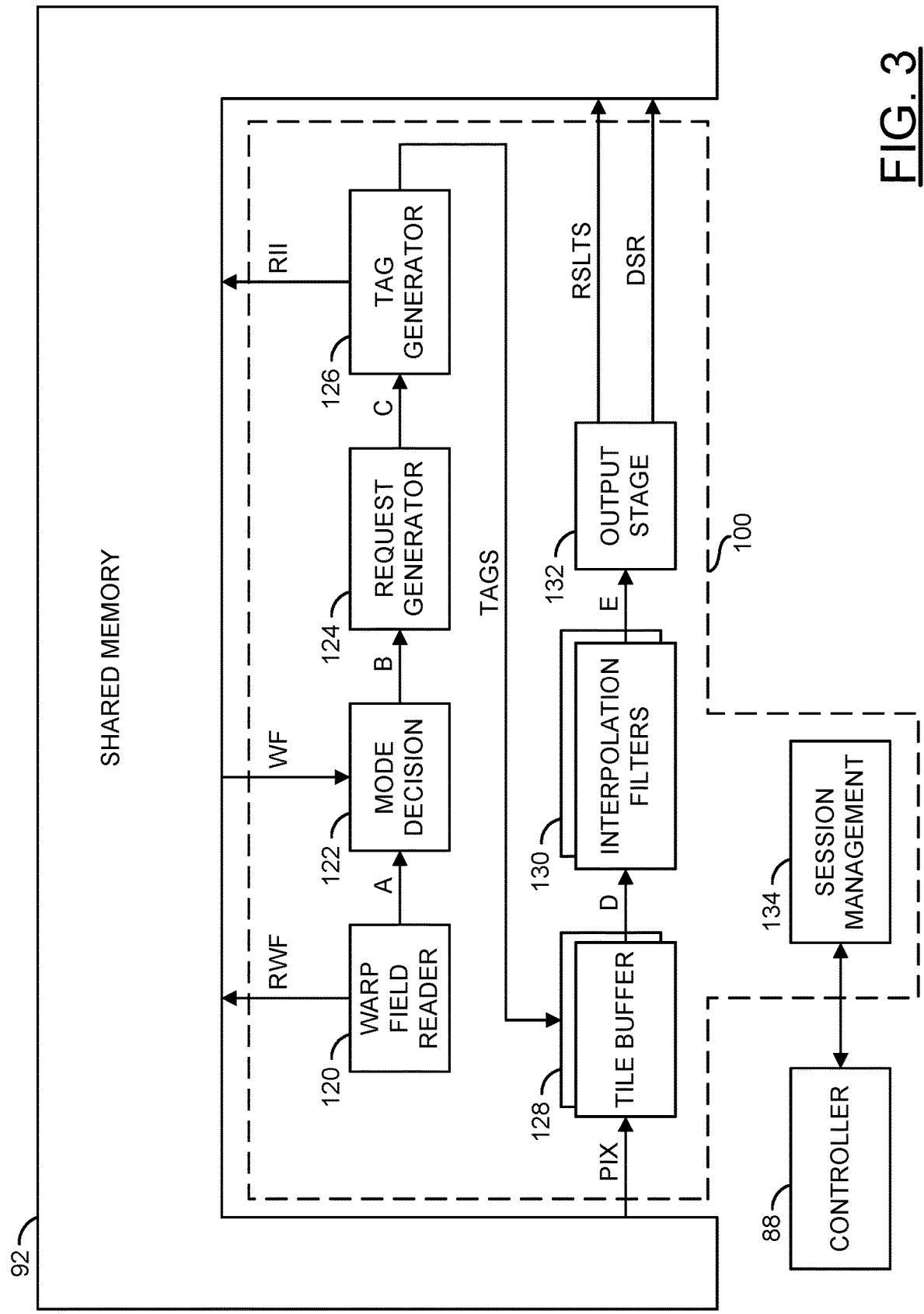
FIG. 3 is a block diagram of a warp filter.

Referring to FIG. 3, a block diagram of an example implementation of the warp filter 100 is shown. The warp filter 100 generally comprises a block (or circuit) 120, a block (or circuit) 122, a block (or circuit) 124, a block (or circuit) 126, one or more blocks (or circuits) 128, one or more blocks (or circuits) 130, a block (or circuit) 132 and a block (or circuit) 134. In some embodiments, the circuits 120 to 134 may be implemented in solely as hardware.

A signal (RWF) may be generated by the circuit 120 and received by the memory 92 within the signal MEM_A. The signal RWF may convey a request for a warp field. A signal (e.g., A) may be generated by the circuit 120 and presented to the circuit 122. The signal A may transfer a notification when a warp field has been requested. The circuit 122 may receive a signal (e.g., WF) from the memory 92 within the signal MEM_A. The signal WF may carry an incoming warp field. A signal (e.g., B) may be generated by the circuit 122 and presented to the circuit 124. The signal B may transfer a current read mode selection. The circuit 124 may generate a signal (e.g., C) received by the circuit 126. The signal C may transfer one or more read requests. A signal (e.g., RII) may be generated by the circuit 126 and sent to the memory 92 within the signal MEM_A. The signal RII may carry one or more requests for an input image. A signal (e.g., TAGS) may be generated by the circuit 126 and presented to the circuits 128. The signal TAGS may carry tags for how the data should be stored in local buffers.

A signal (e.g., PIX) may be received by the circuit 128 from the memory 92 within the signal MEM_A. The signal PIX generally transfers the input data elements (or input pixels) for an input image. The circuits 128 may generate a signal (e.g., D) received by the circuits 130. The signal D may transfer the data elements of the input image. The circuits 130 may generate a signal (e.g., E) received by the circuit 132. The signal E may carry interpolated data elements of an output image. The circuit 132 may generate a signal (e.g., RSLTS) transferred to the memory 92 within the signal MEM_A. The signal RSLTS may transfer the output image resulting from the warp filtering of the input image. A signal (e.g., DSR) may also be generated by the circuit 132 and presented to the memory 92 within the signal MEM_A. The signal DSR may convey data storing requests to write the output image into the memory 92.

The circuit 120 may implement a warp field reader circuit. The reader circuit 120 is generally operational to create a warp field request in the signal RWF and request arbitration from the arbiter 94. The reader circuit 120 may inform the circuit 122 of the request for the warp field in the signal A.

The circuit 122 may implement a mode decision circuit. The mode decision circuit 122 is generally operational to determine a current read mode among several possible read modes for accessing the input image to be warped. The mode decision may be based upon the warp field received from the memory 92 in the signal WF. The mode decision circuit 122 may inform the circuit 124 of the current read mode selection in the signal B.

The circuit 124 may be a request generator circuit. The request generator 124 is generally operational to produce one or more read requests that correspond to the current read mode received in the signal B. The read requests may be transferred to the circuit 126 in the signal C.

The circuit 126 may implement a tag generator circuit. The tag generator 126 is generally operational to pass the requests received in the signal C to the memory 92 in the signal RII. The tag generator 126 may also be operational to generate one or more tags that define how the input data elements of the input image should be stored in the local buffers. The tags may be presented in the signal TAGS to the circuit 128.

The circuits 128 may implement one or more local tile buffers. The local buffers 128 are generally operational to temporarily store the input data elements of the incoming input image received in the signal PIX. The buffered input data elements may be subsequently presented in the signal D to the circuit 130.

The circuits 130 may implement one or more interpolation filters. The interpolation filters 130 are generally operational to interpolate the input data elements of the input image into output data elements (or output pixels) in the output image. The interpolation filters 130 generally use the current read mode to determine how to access the input data elements from the local buffers 128. The output image may be presented in the signal E to the circuit 132.

The circuit 132 may implement an output stage circuit. The output stage circuit 132 is generally operational to write the output image into the memory 92. The output data elements may be transferred to the memory 92 in the signal RSLTS. Request information to store the output data elements may be generated by the output stage circuit 132 and presented to the arbiter 94 in the signal DSR.

The circuit 134 may implement a session management circuit. The session management circuit 134 is generally operational to talk to the scheduler 88 to receive parameters of a warp operation. For example, the parameters may include a data type of the input image (e.g., byte or half-word,) a geometry of the warp field (e.g., width, height, grid size) and a geometry of the input image. The sessions management circuit 134 may also terminates a warp operation early, should the input or output data streams stall. If a stall occurs, the scheduler circuit 88 may initiate an unrelated warp operation while the producer/consumer of the stalled operation is catching up.

Figure 4:
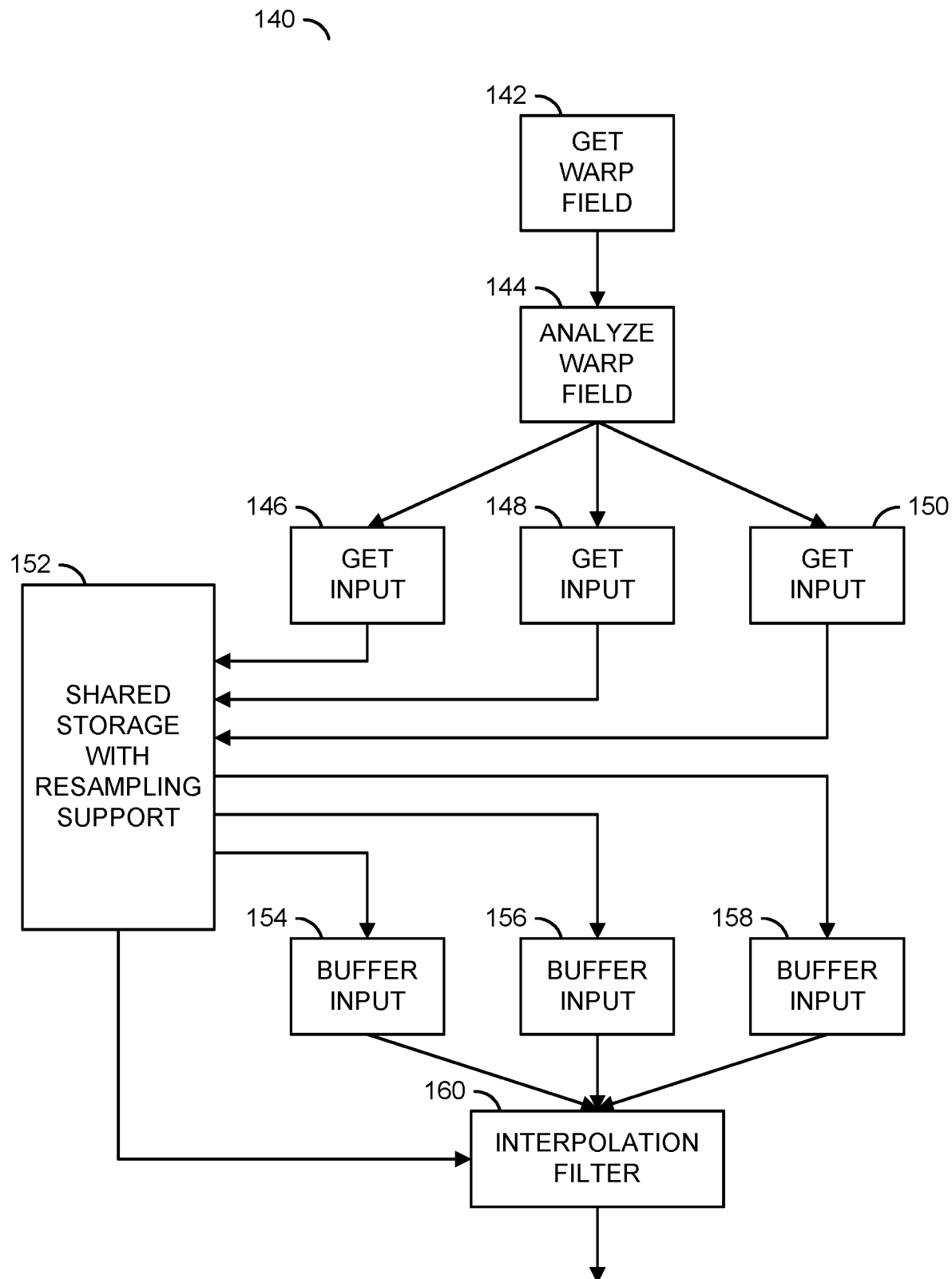
FIG. 4 is a functional flow diagram of a warp filtering method.

Referring to FIG. 4, a functional flow diagram of an example warp filtering method 140 is shown. The method (or process) 140 may be implemented in the coprocessor circuit 84 (e.g., the resource circuit 90a and the memory circuit 92). The method 140 generally comprises a step (or state) 142, a step (or state) 144, a step (or state) 146, a step (or state) 148, a step (or state) 150, a step (or state) 152, a step (or state) 154, a step (or state) 156, a step (or state) 158 and a step (or state) 160.

The method 140 generally prioritizes the minimization of the number of memory requests, and at the same time may reduce the data bandwidth where possible. In the step 142, the warp field reader 120 may initiate a request for a warp field. The mode decision circuit 122 may analyze the warp field in the step 144 to determine an appropriate current mode from among multiple possible read modes (e.g., a box mode, a column mode, a row mode and a pixel mode). Based on the current mode selected by the mode decision circuit 122, the request generator 124 may create one or more read requests that correspond to the selected current mode. If the analysis determines that the input data elements of an input image (or picture, or field, or frame) should be read in one or more single rectangles, the request generator 124 may generate one or more single-rectangle read requests (e.g., LOAD_A type requests or commands) to the tag generator 126 in the step 146. If the analysis determines that the input data elements should be read in multiple rectangles with a uniform displacement, the request generator 124 may generate one or more multi-rectangular read requests (e.g., LOAD_B type requests or commands) to the tag generator 126 in the step 148. If the analysis determines that the input data elements should be read in multiple rectangles with non-integer displacements, the request generator 124 may generate one or more complex multi-rectangular read requests (e.g., LOAD_C type requests or commands) to the tag generator 126 in the step 150.

Based on the selected current mode and the number of requests generated, the tag generator 126 may request the rectangle(s) from the memory 92 in the steps 146, 148 or 150. The memory 92 may respond to the requests in the step 152 by presenting the identified rectangles of input data elements in the step 152. The response may include resampling support. If the current mode is the box mode, the input data elements may be stored in the local buffers 128 in accordance with the tags in the step 154. If the current mode is the row mode, the input data elements may be put into a first-in-first-out (FIFO) established in the local buffers 128 per the tags in the step 156. If the current mode is the column mode, the input data elements may be put into a FIFO established in the local buffers 128 per the tags in the step 158. If the current mode is the pixel mode, the local buffers 128 may be skipped and the input data elements presented directly to the interpolation filters 130. In the step 160, the interpolation filter 130 may warp filter the input data elements received from the local buffers 128 and/or received directly from the memory 92. A result of the warp filtering may be the output image (or picture or field or frame). The output stage 132 may store the output image in the memory 92.

Figure 5:
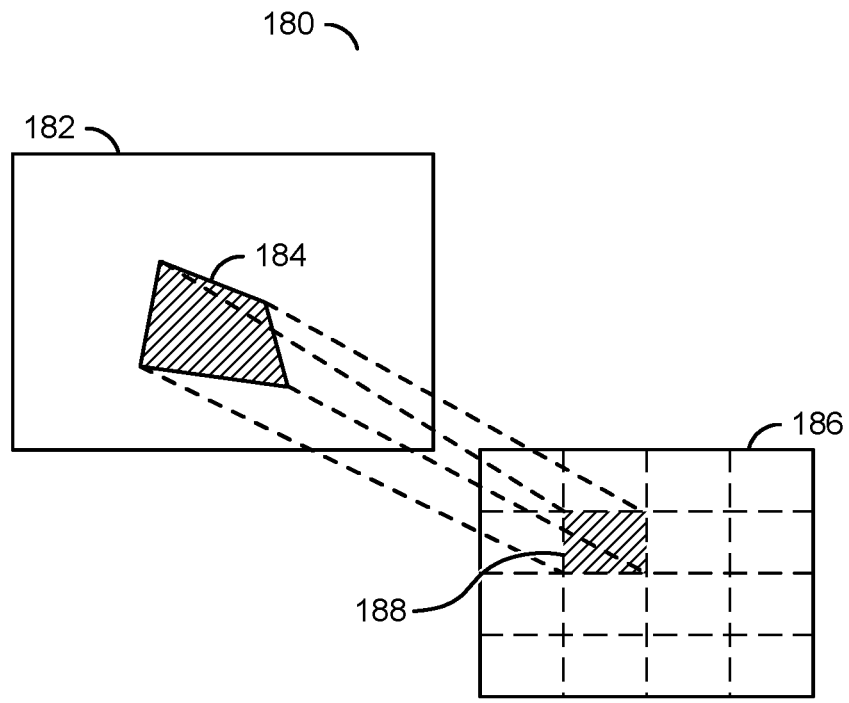
FIG. 5 is a diagram of a warp filter mapping.

Referring to FIG. 5, a diagram of an example warp filter mapping 180 is shown. The warp filter circuit 100 generally maps an output rectangle 188 in an output space 186 to an input quadrilateral 184 in an input space 182. For each pixel in the output rectangle 188, a 2-by-2 or larger square of input data elements from the input space 182 may be read for interpolation.

Figure 6:
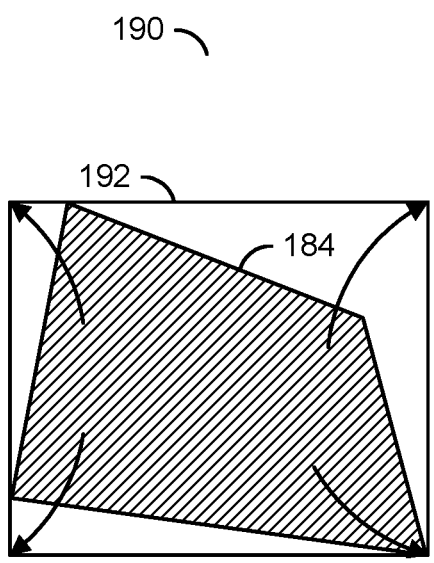
FIG. 6 is a diagram of a quadrilateral in an input space.

Referring to FIG. 6, a diagram of an example quadrilateral in an input space 190 is shown. A rectangle 192 in the input space 182 may be defined as a smallest rectangle of input data elements that contains the entire quadrilateral 184. When warping the quadrilateral 184 to the square 188, all of the input data elements within the rectangle 192 may be read from the memory 92 into the warp filter 100.

The warp filtering operation is generally a piecewise linear resampling filter operation, with the pieces called "grids." A warp filter may implement a warp field (e.g., G) as follows. For each i in a range of 0 to $Q_{height}$ and each j in a range of 0 to $Q_{width}$, where Q may be an output picture, each data location ($i_g$, $j_g$) may be determined by formula set 1 as follows:

$$i_g = \frac{i}{2^{Rh}}, \; j_g = \frac{j}{2^{Rw}} \quad (1)$$

The parameter $R_h$ may be a vertical scale factor between the warp field G and an output space or a height of the grid. The parameter $R_w$ may be a horizontal scaling factor between the warp field G and the output space or a width of the grid. Four values (e.g., g[0] to g[3]) of the warp field G may be determined by formula set 2 as follows:

$$g[0]=G[\lfloor i_g \rfloor+0][\lfloor j_g \rfloor+0]$$

$$g[1]=G[\lfloor i_g \rfloor+0][\lfloor j_g \rfloor+1]$$

$$g[2]=G[\lfloor i_g \rfloor+1][\lfloor j_g \rfloor+0]$$

$$g[3]=G[\lfloor i_g \rfloor+1][\lfloor j_g \rfloor+1] \quad (2)$$

Where G[i][j] may be a vector of the warp field G at location (i,j). The symbol "$\lfloor \; \rfloor$" generally represent a floor function.

The data location may be mapped onto an input matrix (e.g., S) by formula 3 as follows:

$$S=(i,j)+\text{bilinear}(i_g-\lfloor i_g \rfloor, j_g-\lfloor j_g \rfloor, g) \quad (3)$$

Each element of the output picture Q may be determined by formula 4 as follows:

$$Q[i][j]=\text{interpolate}(S_x-\lfloor S_x \rfloor, S_y-\lfloor S_y \rfloor, M) \quad (4)$$

The parameter (e.g., M) may be a square having dimensions t-by-t from an input picture (e.g., P) around S. The parameter t may be a number of interpolation taps of the warp filter.

The memory 92 is generally designed to support multiple (e.g., 3) types of requests (or commands). A simple type of request (e.g., LOAD_A) may return a rectangular region of the input image from a specified starting coordinate (e.g., (start_x, start_y)) and of a specified size (e.g., (width, height)). Another type of request (e.g., LOAD_B) may return multiple rectangles from the starting coordinate (or location), the specified size, a count of the number of rectangles (e.g., block_count) and a displacement value (e.g., (displacement_x, displacement_y) of neighboring rectangles. A complex type of request (e.g., LOAD_C) may be useful for downsampling filter operations. The LOAD_C requests may return multiple rectangles from the starting coordinate, the specified size, the count number, the displacements and multiple displacement-plus-one offset flags (e.g., disp_plus_one_flags_x, disp_plus_one_flags_y).

To reduce the number of requests, and so the consumed request bandwidth, each LOAD_B and LOAD_C request may fetch multiple rectangles (or blocks) of the input data elements. Each LOAD_B and LOAD_C request generally includes the starting position for the initial block and specifies the displacement from one block to the next. The displacement values in the LOAD_B requests may be integer numbers.

A resampling filter (e.g., the warp filter 100) may often use rational numbers as the displacement. However, the memory 92 may support only integer numbers as the displacement due to integer-valued addresses. The LOAD_C type requests may be used to accommodate the rational-numbered displacements. For example, let a horizontal phase increment of the resampling setting be $\varphi_{inc}$=1.42, and ignore the vertical phase increment for now. The resampling filter operation would like to receive the input data elements from evenly spaced, non-integer locations, each 1.42 pixels away from each other.

Figure 7:
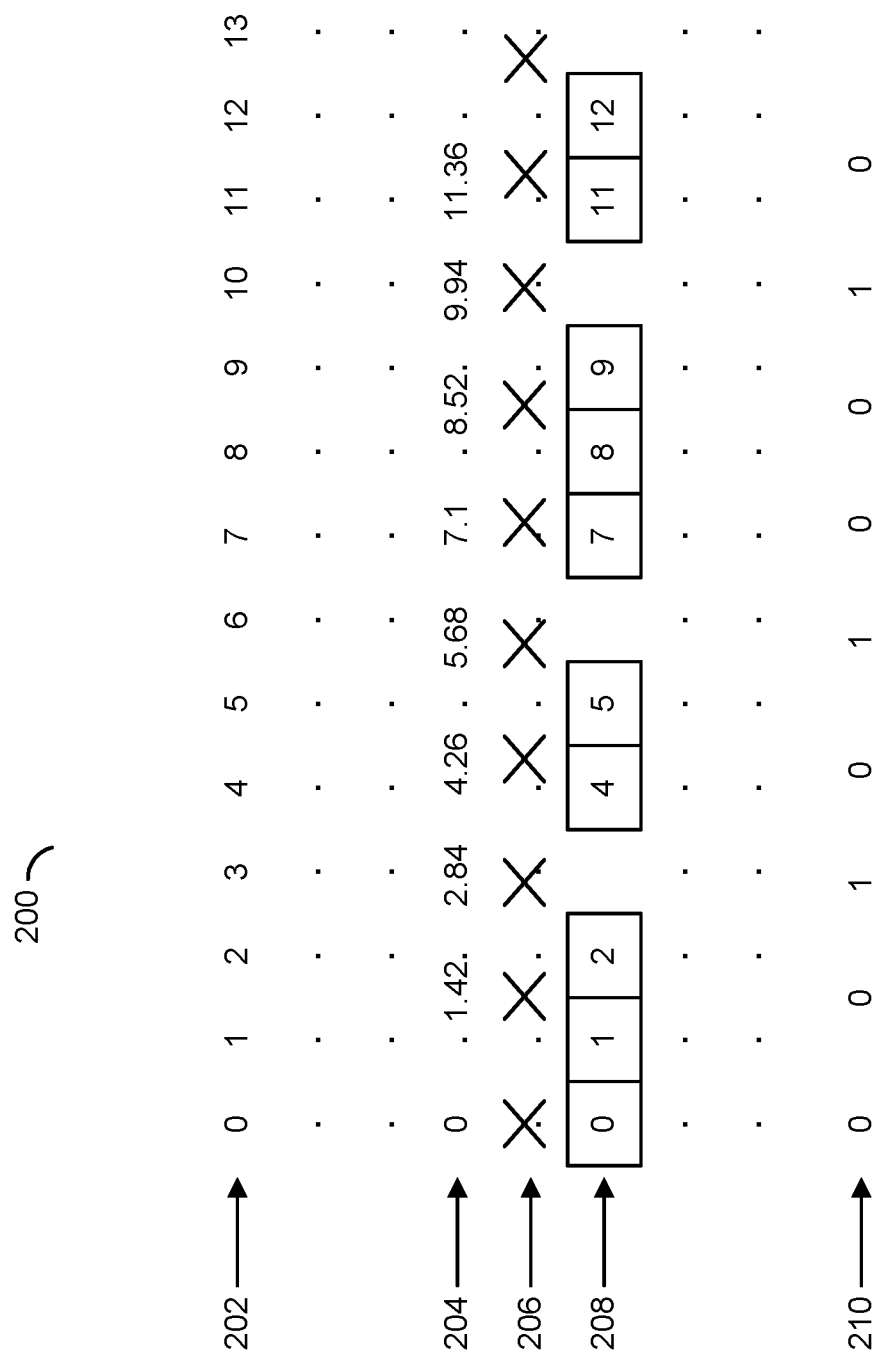
FIG. 7 is a diagram of a row of an input space.

Referring to FIG. 7, a diagram of an example row of an input space 200 is shown. The row may contain input data elements 202 organized in columns (e.g., columns 0 to 13 are illustrated). Example rational-valued locations (e.g., 0, 1.42, 2.84, 4.26, . . . , 11.36) requested within the input image are generally referenced by arrow 204. Fractional locations of the input image corresponding to the rational-valued locations may be designated by "X", see arrow 206. The actual input data elements that may be read from the memory 92 is illustrated as squares, see arrow 208. A string of displacement-plus-one flags 210 in one dimension (e.g., the X dimension) may show where each extra single-column displacement (or skip) generally exists in reading the input data elements.

The read requests to the memory 92 may round the fractional locations down to the nearest integer (e.g., 1.42 is rounded down to 1), as depicted by the squares. Although a pattern may exist in the rounded-down locations, the rounded-down locations may not be evenly spaced. Some rounded-down locations may be one pixel away from the neighbors, some may be two pixels away. Consider the skipped pixel at location 3. Location 3 may be skipped because a sum of the fractional part of the location 3 rational value of 2.84 with the fractional part of $\varphi_{inc}$=1.42 is more than 1.0. The skip information may be provided to the memory 92 as part of the LOAD_C requests. Without the LOAD_C type of request, the blocks of data (each t-by-t square around the locations shown in FIG. 7) may be read from the memory. Four requests may be used: a request for the three t-by-t blocks each around the first three squares (e.g., 0, 1 and 2), a request for the two t-by-t blocks centered around the next two squares (e.g., 4 and 5), a request for the three t-by-t blocks each around the next three squares (e.g., 7, 8 and 9) and a request for the two t-by-t blocks centered around the next two squares (e.g., 11 and 12). Instead, a single LOAD_C request may access all of the blocks. A way to interpret the disp_plus_one_flags_x string 208 is that for some rectangles, the displacement is one more than the displacement_x. The same interpretation may apply to the disp_plus_one_flags_y string. While FIG. 7 illustrates access displacements to the input image in one dimension (e.g., the X dimension), similar access displacements may be performed in other dimensions (e.g., the Y dimension).

The warp filter 100 generally has a processing granularity. In various embodiments, the processing granularity may typically be a rectangular area having a width and a height (e.g., W×H). The warp filter 100 may analyze the warp vectors. For a processing granularity in the output space, the warp filter 100 may find a set of input data elements in the input space. By the nature of the warp filtering technique, the set of input data elements may be a quadrilateral (e.g., quadrilateral 184 in FIG. 6). The warp filter 100 may find a rectangular bounding box (e.g., box 192 in FIG. 6) of the quadrilateral. A ratio of the bounding box to the processing granularity may be calculated according to formula set 5 as follows:

$R_x$=width of the bounding box/width of the processing granularity $R_y$=height of the bounding box/height of the processing granularity (5)

The warp filter 100 may also calculate partial derivatives of the warp field G at the processing granularity using the formula set 6 as follows:

$\partial G_x/\partial x|top, \partial G_y/\partial x|top$ $\partial G_x/\partial x|bottom, \partial G_y/\partial x|bottom$ $\partial G_y/\partial y|left, \partial G_x/\partial y|left$ $\partial G_y/\partial y|right, \partial G_x/\partial y|right$ (6)

Figure 8:
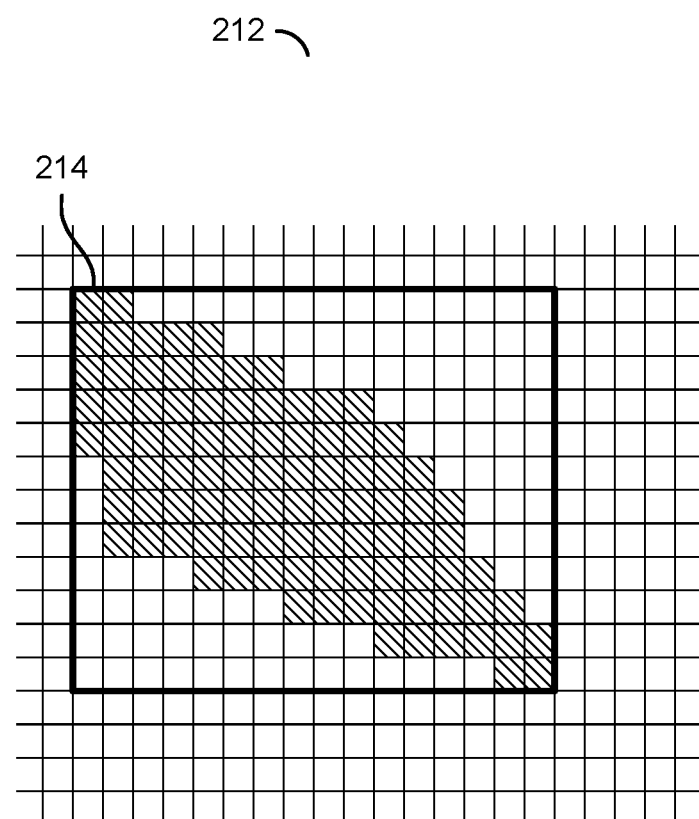
FIG. 8 is a diagram of an input space accessed in a box mode.

Referring to FIG. 8, a diagram of an input space 212 access in a box mode is shown. The hatched squares may indicate input data elements from the input space 212 that are entered into an interpolation. The warp filter 100 may select a current read mode. The parameters $R_x$ and $R_y$ may initially be checked against suitable thresholds (e.g., $T_{x1}$ and $T_{y1}$). If the conditions $R_x < T_{x1}$ and $R_y < T_{y1}$ are meet, the warp filter 100 may use the box mode as the current read mode. Otherwise, the warp filer 100 may check other conditions for other modes. If no other mode is chosen, the warp filter 100 may choose a pixel mode as the current read mode.

The following steps may be performed in the box mode. The warp filter 100 may issue one LOAD_A read request that covers every input data element in a bounding box (e.g., box) 214 from the input image. When the input data elements come back from the memory 92, the input data elements may be stored the local buffers 128. The local buffers 128 may be structured as an array. Every output data element in the processing granularity may have the corresponding input data elements available. By issuing a single LOAD_A request in the example, the warp filter 100 may receive a rectangle of input data elements, as shown in FIG. 8.

For each output data element, the following interpolation filtering steps may be performed. When the warping of the processing granularity is done, the local buffers 128 for the next processing granularity may be emptied. Banked local buffers 128 may be used for parallel loading and processing. The choice of the thresholds $T_{x1}$ and $T_{y1}$ generally determines the size of each bank of the local buffers 128. In various embodiments, a typical choice may be $T_{x1}=1-(t-1)/W$ and $T_{y1}=1-(t-1)/H$, where t is the number of filter taps. A result may determine the space in the local buffers 128 of W×H elements per bank, the same size as the processing granularity.

In the row mode, for a suitable threshold (e.g., $T_2$), and if the partial warp field derivatives $\partial G_x/\partial x|top$, $\partial G_y/\partial x|top$, $\partial G_x/\partial x|bottom$, and $\partial G_y/\partial x|bottom$ are all less that the threshold $T_2$, the following steps may be performed. For each row in the processing granularity, issue a single LOAD_C read request to cover the entire row. Each block in the request may cover the input regions (e.g., the t-by-t squares) of multiple output data elements, and some to all of the regions may overlap horizontally. The block size in the request should be larger than t-by-t so that multiple input regions may fit into a single block. The block size may also be a size that the memory 92 may efficiently access and present. For example, the width of the blocks may be a multiple of a bus width. The block size may be determined at design time and may not be dependent on the warp vectors.

When preparing the LOAD_C request, the warp filter 100 may scan through every input region for an output data element row. For each region, the warp filter 100 may determine if the input region fits in the current block. If not, the parameter block_count in the request may be incremented. The location of a new block is generally assigned such that the new region is placed at the corner of the block, leaving maximum room for adding more regions to the new block.

If the new block is the second block of the request, the warp filter 100 may calculate the displacement_x and the displacement_y from the location of the first block and the second block. If the new block is not the second block, the displacement may either be the same as the displacement already calculated, or may be a unit (e.g., 1) higher than that displacement. For the latter case, the corresponding disp_plus_one_flag may be marked with a "1" value.

In the row mode, the tile buffer 128 is generally structured as a FIFO. When the input data elements are received from the memory 92, the warp filter 100 may move the input data elements into the FIFO. Each entry of the FIFO generally holds a single block. The FIFO entries may be tagged with the locations of the blocks in the input space. At an output side of the FIFO, a single block may be dequeued at a time. The warp filter 100 (e.g., the interpolation filters 130) may walk through the output space data elements in a raster-scan order, checking the location of the respective input region in the process. If, by comparing the location of the region and the location of the block, the warp filter 100 determines that the region resides in the block, the warp filter 100 may perform the interpolation filtering and generate a single output data element. If the region is not in the current block, the region may be in the next block. The warp filter 100 may discard the current block and dequeue a new block from the FIFO. In various embodiments, a good choice for the threshold $T_2$ may be the parameter t. For threshold $T_2$ values larger than the parameter t, the regions may stop overlapping.

Figure 9:
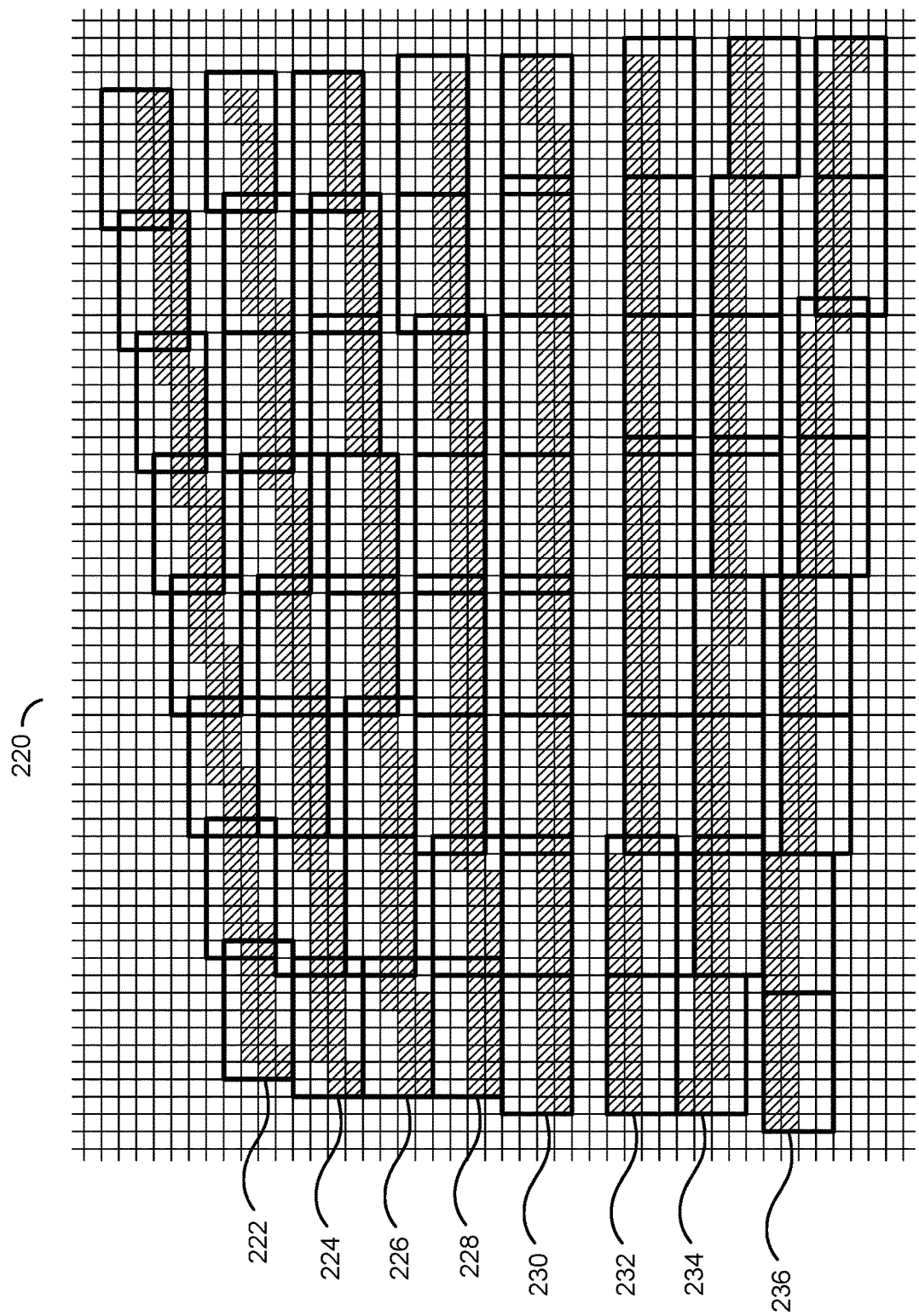
FIG. 9 is a diagram of an input space accessed in a row mode.

Referring to FIG. 9, a diagram of an example input space 220 accessed in the row mode is shown. In the example illustrated, the parameter t may be 2, the block size may be 8×4, and the processing granularity may be 32×8. Coordinate (0,0) in the input space 220 may be a top-left corner (not shown). The hatched squares may indicate input data elements from the input space 220 that are entered into an interpolation. The rectangles may be requested rectangles being read from the memory 92. In the example, 8 read requests are shown, with 8 rectangles (or blocks) per request. The 8 requests may be illustrated in Table 1 as follows:

TABLE 1

| Start | Block_Count | Disp | Disp_plus_one_flags_x | Disp_plus_one_flags_y |
|---|---|---|---|---|
| (57, 57) | 8 | (7, −1) | [0, 0, 0, 0, 0, 0] | [0, 0, 0, 0, 0, 0] |
| (56, 61) | 8 | (7, −1) | [0, 1, 0, 0, 0, 1, 0] | [0, 0, 1, 0, 0, 1, 0] |
| (56, 65) | 8 | (7, −1) | [0, 1, 0, 0, 1, 0, 0] | [0, 1, 0, 1, 0, 1, 0] |
| (56, 69) | 8 | (7, −1) | [0, 0, 1, 0, 1, 0, 1] | [1, 0, 1, 1, 1, 0, 1] |
| (55, 73) | 8 | (7, 0) | [1, 0, 1, 0, 1, 1, 0] | [0, 0, 0, 0, 0, 0, 0] |
| (55, 79) | 8 | (7, 0) | [1, 0, 1, 1, 0, 1, 1] | [0, 1, 0, 0, 0, 0, 0] |
| (55, 83) | 8 | (7, 0) | [0, 1, 1, 1, 0, 1, 1] | [1, 0, 0, 1, 0, 0, 1] |
| (54, 88) | 8 | (7, 0) | [1, 1, 1, 1, 1, 0, 1] | [0, 1, 0, 1, 0, 1, 0] |

The request at starting location (57,57) may return 8 blocks starting with block 222 and working to the right. Each subsequent block may be displaced by 7 elements to the right and 1 element upward (e.g., −1). The initial request may not include any active displacement-plus-one-flags (e.g., the displacement-plus-one-flags all are zero).

The request at starting location (56,61) may return 8 blocks starting with block 224 and continuing to the right. Each subsequent block may be displaced by 7 elements to the right and 1 element upward. Two active displacement-plus-one-flags may be included in each of the X dimension and the Y dimension.

The requests at subsequent starting locations (56,65) and downward in Table 1 to location (54,88) may each return 8 blocks starting with blocks 226 to 236. The displacements and displacement-plus-one-flags may vary from request to request. By issuing 8 LOAD_C requests in the example, the warp filter 100 may receive 64 rectangles of input data elements, as shown in FIG. 9. In the example, the 64 rectangles may contain 256 t-by-t squares. Each square generally corresponds to a set of the 32×8 pixels in the processing granularity.

In a column mode, for a suitable threshold (e.g., $T_3$), and if the partial warp field derivatives $\partial G_y/\partial y|\text{left}$, $\partial G_x/\partial y|\text{left}$, $\partial G_y/\partial y|\text{right}$, and $\partial G_x/\partial y|\text{right}$ are all less than the threshold $T_3$, the warp filter 100 may perform the following steps. For each column in the processing granularity, issue a LOAD_C request to cover the entire column. Each block in the request may cover the input regions (e.g., the t-by-t squares) of multiple output data elements, where the regions may overlap vertically. The block size in the request should be larger than t-by-t, so that multiple input regions may fit into a single block. The block size should also be a size that the memory 92 may efficiently access and present the input data elements. For example, the width of the blocks may be a multiple of the bus width. The block size may be determined at design time and is generally not dependent on the warp vectors.

When preparing a LOAD_C request, the warp filter 100 may scan through every input region for an output data element column. For each region, the warp filter 100 may determine if the region fits in the current block. If not, the parameter block_count in the request may be incremented. The location of a new block may be assigned such that the new region is placed at the corner of the block, leaving maximum room for adding more regions to the new block. If the new block is the second block of the request, the displacement_x and the displacement_y may be calculated from the locations of the first block and the second block. If the new block is not the second block, the displacement may either be the same as the displacement already calculated, or may be a unit (e.g., 1) higher than that displacement. For the latter case, the corresponding displacement-plus-one-flag may be marked with a "1" value.

When the input data elements are received from the memory 92, the warp filter 100 may store the received data element into a FIFO established in the local buffers 128. Each entry of the FIFO generally holds a single block. The FIFO entries may be tagged with the locations of the blocks in the input space. On the other side of the FIFO, one block is dequeued at a time. The warp filter 100 may walk through the output space data elements in a transposed raster-scan order, checking the location of the respective input region in the process. If, by comparing the location of the region and the location of the block, the warp filter 100 determines that the region resides in the current block, the interpolation filtering may be performed to generate an output data element. If the region is not in the current block, the region may be in the next block. The warp filter 100 may discard the current block and dequeue a new block from the FIFO. In various embodiments, a good choice for the threshold $T_3$ may be the parameter t. For threshold $T_3$ values larger than the parameter t, the regions generally stop overlapping.

Figure 10:
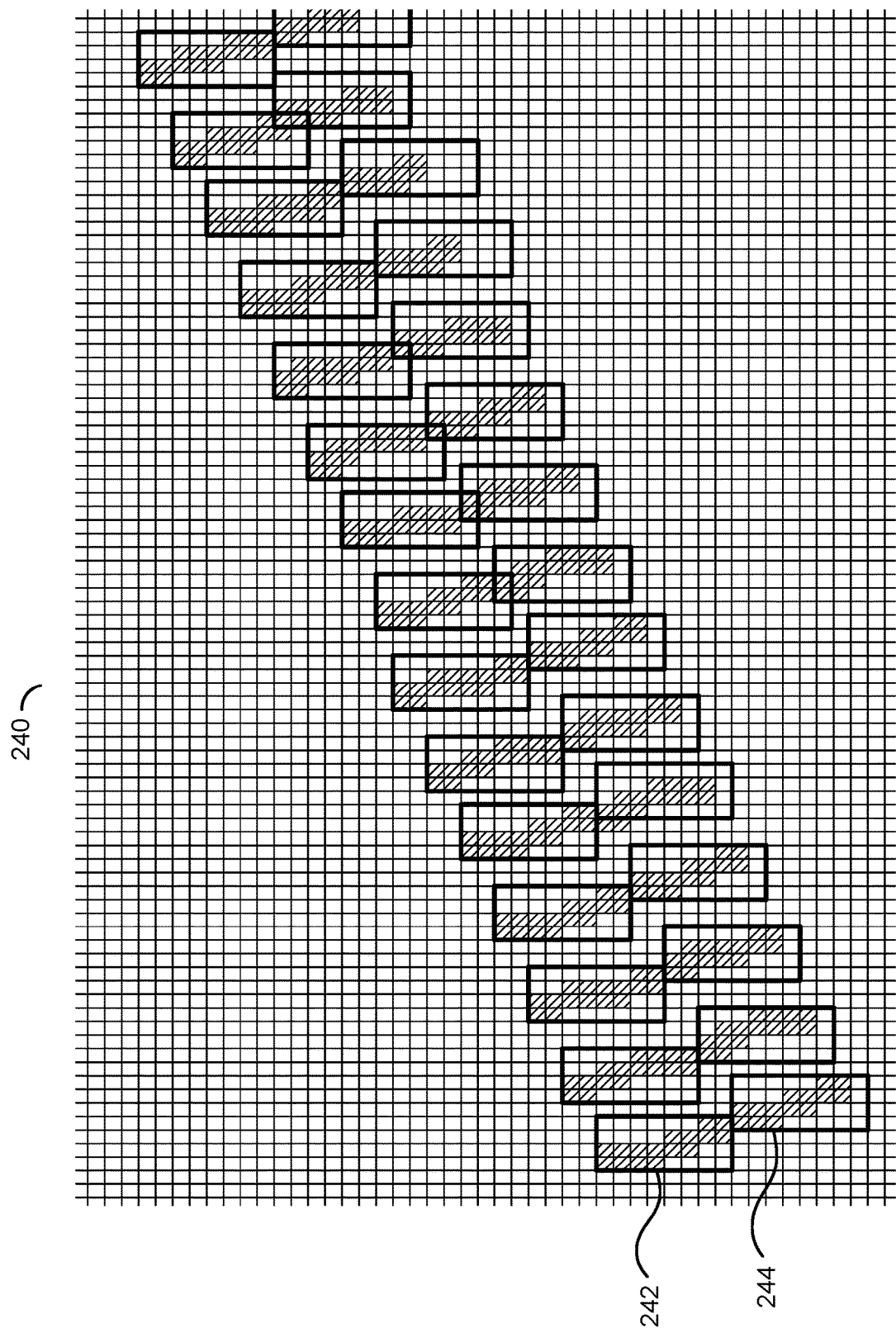
FIG. 10 is a diagram of an input space accessed in a column mode.

Referring to FIG. 10, a diagram of an example input space 240 accessed in the column mode is shown. In the example illustrated, the parameter t may be 2, the block size may be 8×4, and the processing granularity may be 16×8. Coordinate (0,0) in the input space 240 may be a top-left corner (not shown). The hatched squares may indicate input data elements from the input space 240 that are suitable for an interpolation. The rectangles may be requested rectangles being read from the memory 92. In the example, 16 read requests are shown, with 2 rectangles (or blocks) per request. The 16 requests may be illustrated in Table 2 as follows:

TABLE 2

| Start | Block_Count | Disp | Disp_plus_one_flags_x | Disp_plus_one_flags_y |
|---|---|---|---|---|
| (17, 77) | 2 | (3, 8) | [0] | [0] |
| (22, 75) | 2 | (3, 8) | [0] | [0] |
| (28, 73) | 2 | (3, 8) | [0] | [0] |
| (34, 71) | 2 | (3, 8) | [0] | [0] |
| (40, 69) | 2 | (2, 8) | [0] | [0] |
| (45, 67) | 2 | (3, 8) | [0] | [0] |
| (51, 65) | 2 | (3, 8) | [0] | [0] |
| (57, 64) | 2 | (2, 7) | [0] | [0] |
| (63, 62) | 2 | (2, 7) | [0] | [0] |
| (68, 60) | 2 | (3, 7) | [0] | [0] |
| (74, 58) | 2 | (3, 7) | [0] | [0] |
| (80, 56) | 2 | (3, 8) | [0] | [0] |
| (86, 54) | 2 | (3, 8) | [0] | [0] |
| (91, 52) | 2 | (3, 6) | [0] | [0] |
| (97, 50) | 2 | (3, 8) | [0] | [0] |
| (103, 48) | 2 | (3, 8) | [0] | [0] |

The request at starting location (17,77) may return 2 blocks starting with block 242 and working downward to the block 244. The block 244 may be displaced by 3 elements to the right and 8 elements down from the block 242. The initial request may not include any active displacement-plus-one-flags.

The requests at subsequent starting locations (22,75) and downward in Table 2 to location (103,48) may each return 2 blocks. The displacements and displacement-plus-one-flags may vary from request to request. By issuing 16 LOAD_C requests in the example, the warp filter 100 may receive 32 rectangles of input data elements, as shown in FIG. 10.

In some situations, the warp vectors may describe a sparse region. In a sparse region, none of the input t-by-t blocks (e.g., the blocks actually used to generate the output data) may be adjacent to each other, and thus are sparse (e.g., for example, see FIG. 11). Since the warp field generally defines piece-wise linear regions of operation, the warp field may instruct the interpolation filter to read the input pixels in a sparse way for all output pixels in a rectangular region. In some other regions, the warp field may instruct the interpolation filter to read those t-by-t blocks overlapped with each other, as seen in the row mode, or implied in the box mode. In a sparse field case, the warp filter 100 may use a pixel mode. In the pixel mode, the warp filter 100 may issue a single LOAD_C request for each row in the processing granularity, for a total of H rows and thus H requests. The LOAD_A requests may be inefficient in sparse regions because input data elements in the sparse regions are disjoint and the data bandwidth may be wasted. The LOAD_B requests may also be inefficient because the blocks are not evenly spaced in the sparse regions. Each LOAD_C request may ask for W blocks, and each block may cover the input region for a single output data element. The size of each block may be determined by the number of taps used in the interpolation filter. Without the LOAD_C requests, the warp filter 100 may issue W×H LOAD_A requests that may clog the request interface to the arbiter 94.

Once the input data elements are received from the memory 92, the received data elements may be sent directly to the interpolation filters 130 without being buffered in the local buffers 128 in some embodiments. The local buffers 128 may be bypassed because the input data elements may already be arranged in the raster-scan order. In other embodiments, the input data elements may be stored in a FIFO (e.g., the local buffers 128 may be structures as the FIFO) for the purpose of rate matching. The interpolation filters 130 may receive the input data elements from the FIFO.

Figure 11:
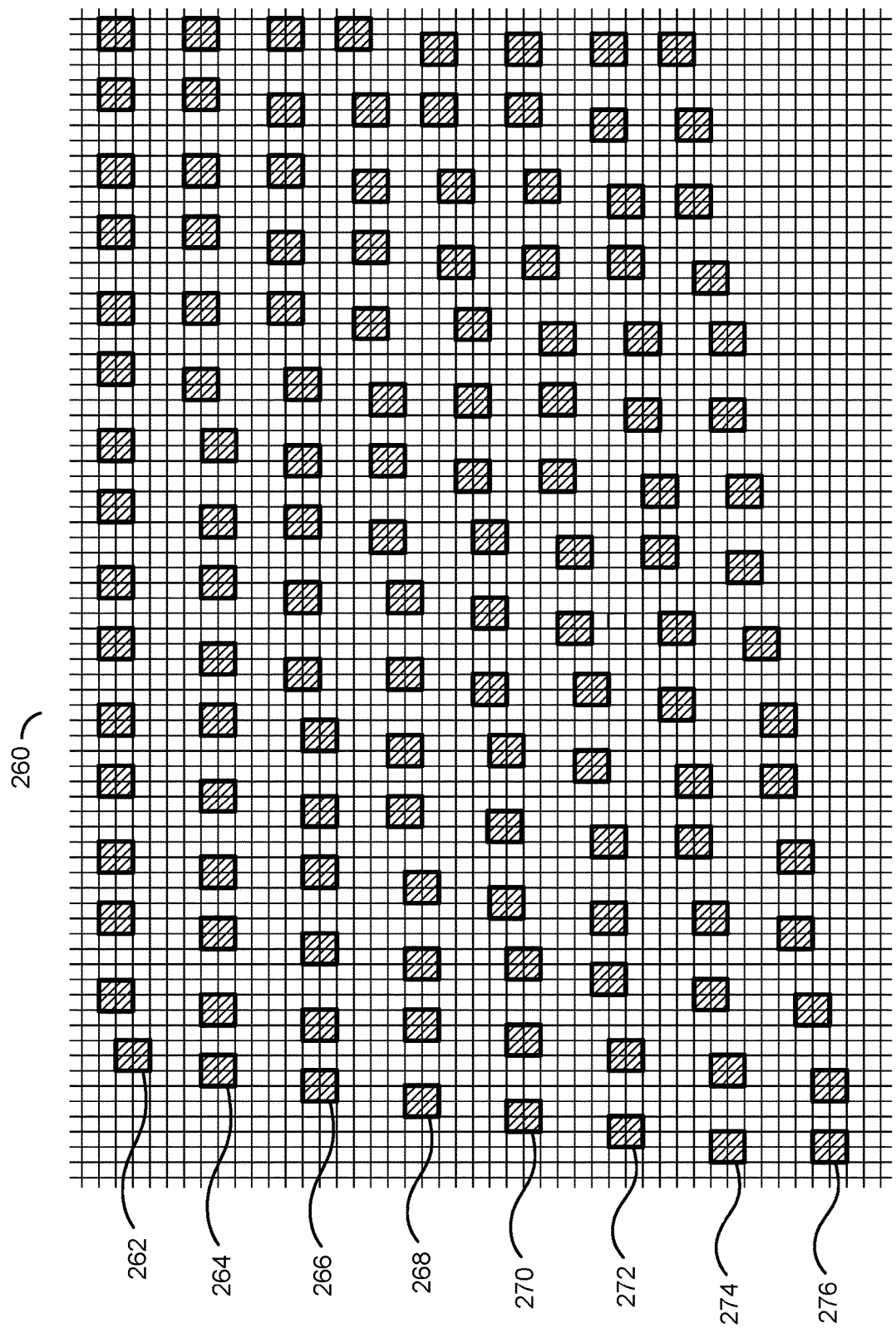
FIG. 11 is a diagram of an input space accessed in a pixel mode.

Referring to FIG. 11, a diagram of an example input space 260 accessed in the pixel mode is shown. In the example illustrated, the parameter t may be 2, the block size may be 8×4, and the processing granularity may be 16×8. Coordinate (0,0) in the input space 260 may be a top-left corner (not shown). The hatched squares may indicate input data elements from the input space 260 that are suitable for an interpolation. The rectangles may be requested rectangles being read from the memory 92. In the example, 8 read requests are shown, with 16 rectangles (or blocks) per request. The 8 requests may be illustrated in Table 3 as follows:

TABLE 3

| Start | Block_Count | Disp | Disp_plus_one_flags_x | Disp_plus_one_flags_y |
|---|---|---|---|---|
| (57, 59) | 16 | (4, −1) | [0, 1, 0, 1, 0, 1, 0, 1, 0, 1, 0, 1, 0, 1, 0, 0] | [0, 1, 1, 1, 1, 1, 1, 1, 1, 1, 1, 1, 1, 1, 1, 1] |
| (56, 64) | 16 | (4, −1) | [0, 1, 0, 1, 1, 0, 1, 0, 1, 0, 1, 1, 0, 1, 0, 0] | [1, 1, 1, 1, 1, 1, 1, 1, 1, 0, 1, 1, 1, 1, 1, 1] |
| (55, 70) | 16 | (4, −1) | [0, 1, 1, 0, 1, 1, 0, 1, 0, 1, 1, 0, 1, 0, 0, 1] | [1, 1, 1, 1, 1, 1, 1, 1, 1, 1, 0, 1, 1, 1, 1, 1] |
| (54, 76) | 16 | (4, −1) | [1, 0, 1, 1, 0, 1, 1, 0, 1, 0, 1, 1, 0, 1, 1, 0] | [1, 1, 1, 0, 1, 1, 1, 0, 1, 1, 0, 1, 1, 1, 1, 0] |
| (53, 82) | 16 | (4, −1) | [1, 1, 0, 1, 1, 0, 1, 1, 0, 1, 1, 0, 1, 1, 0, 0] | [1, 1, 0, 1, 1, 0, 1, 1, 0, 1, 0, 1, 0, 1, 0, 1] |
| (52, 88) | 16 | (4, −1) | [1, 1, 0, 1, 1, 1, 0, 1, 1, 1, 0, 1, 1, 1, 0, 0] | [1, 0, 1, 1, 0, 1, 0, 1, 0, 1, 1, 0, 1, 0, 1, 1] |
| (51, 94) | 16 | (4, −1) | [1, 1, 1, 1, 0, 1, 1, 1, 0, 1, 1, 1, 0, 1, 1, 0] | [1, 0, 1, 1, 0, 1, 0, 0, 1, 0, 1, 0, 1, 0, 0, 1] |
| (51, 100) | 16 | (4, −1) | [0, 1, 1, 1, 1, 0, 1, 1, 1, 1, 0, 1, 1, 1, 1, 1] | [1, 0, 0, 1, 0, 1, 0, 0, 0, 1, 0, 1, 0, 0, 1, 0] |

The request at starting location (57,59) may return 16 blocks starting with block 262 and working to the right. Each subsequent block may be displaced by 4 elements to the right and 1 element upward (e.g., −1). The initial request may include various active displacement-plus-one-flags.

The request at starting location (56,64) may return 16 blocks starting with block 264 and continuing to the right. Each subsequent block may be displaced by 4 elements to the right and 1 element upward. Various active displacement-plus-one-flags may be included in each of the X dimension and the Y dimension.

The requests at subsequent starting locations (55,70) and downward in Table 3 to location (51,100) may each return 16 blocks starting with blocks 266 to 276. The displacements and displacement-plus-one-flags may vary from request to request. By issuing 8 LOAD_C requests in the example, the warp filter 100 may receive 128 rectangles of input data elements, as shown in FIG. 11.

The box mode may use single-block requests. The box mode may fetch some input data elements (or pixels) that are never used, and so may waste a small amount of the data bandwidth. The waste may be acceptable in an upsampling region because each useful input data element may be referenced multiple times. The ratio of input to output data rate may still be less than 1.00. The row mode and the column mode may provide compromises between the request bandwidth and the data bandwidth. The pixel mode generally wastes no data bandwidth while in a downsampling region where no two output data elements refer to the same input data element.

Figure 12:
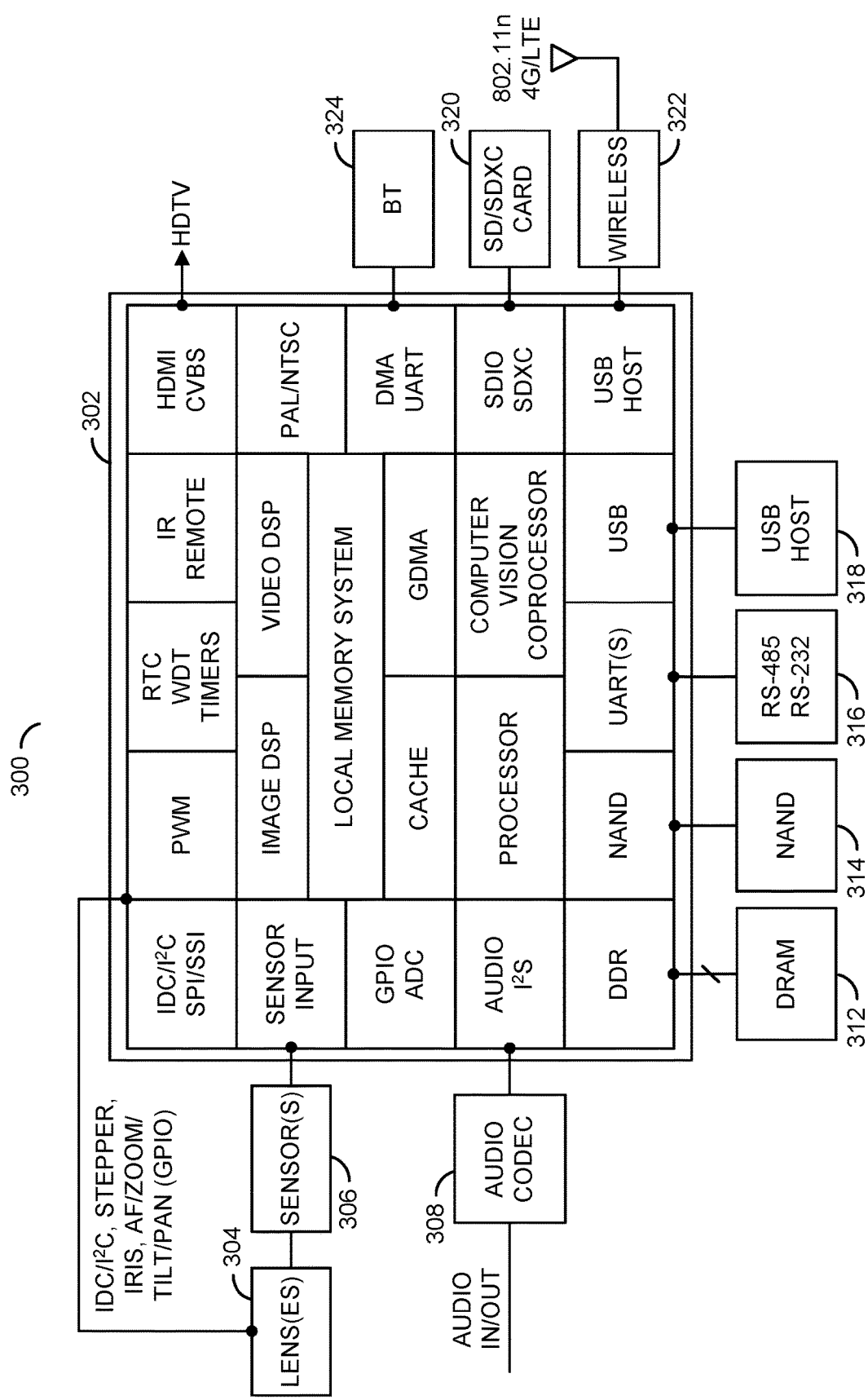
FIG. 12 is a diagram of a computer vision system.

Referring to FIG. 12, a diagram of a camera system 300 is shown illustrating an example implementation of a computer vision system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300. In one example, the camera system 300 may comprise a processor/camera chip (or circuit) 302, one or more lens assemblies 304, one or more image sensors 306, an audio input/output circuit 308, which may include an optional audio codec, dynamic random access memory (DRAM) 312, non-volatile memory (e.g., NAND flash memory) 314, one or more serial interfaces 316, one or more universal serial bus (USB) interfaces for connecting to or acting as a USB host 318, an interface for connecting to a removable media 320 (e.g., SD, SDXC, etc.), a wireless interface 322, and a BLUETOOTH interface 324. In various embodiments, the wireless interface 322 and/or the USB Host 318 may be configured for communicating with a camera controller wirelessly.

The processor/camera circuit 302 may include a number of modules including a pulse width modulation (PWM) module, a real time clock, watch dog timer, and timers (RTC/WDT/TIMERS), an infrared (IR) remote interface, a high-definition multimedia interface (HDMI), a PAL/NTSC interface, a general purpose input/output (GPIO) and analog-to-digital converter (ADC) module, a direct memory access (DMA) universal asynchronous receiver transmitter (UART), a secure digital input/output (SDIO) and SD or xD (SDXC) card interface, an image sensor interface, and one or more of an inter-IC sound ($I^2S$) interfaces, an inter-IC control ($I^2C$) interface, and synchronous data communications interfaces (e.g., SPI, SSI, etc.). The circuit 302 may also include one or more embedded processors (e.g., ARM, etc.), the computer vision coprocessor, an encryption/decryption block, an image digital signal processor (DSP), a video DSP, a local memory system, a cache (e.g., L2 CACHE), and a graphics direct memory access (GDMA) engine. The circuit 302 may be configured (e.g., programmed) to control the one or lens assemblies 304 and the one or more image sensors 306. The circuit 302 may receive raw image data from the sensor 306. The circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The circuit 302 may receive encoded and/or uncoded (e.g., raw) audio data from the audio input 308. The circuit 302 may also receive encoded audio data from the USB and/or SDIO interfaces. The circuit 302 may provide encoded video data to the wireless interface 322 (e.g., using the USB host interface). The wireless interface 322 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The circuit 302 may also include support for communication using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable, logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. As used herein, the term "simultaneously" is meant to describe events that share some common time period but the term is not meant to be limited to events that begin at the same point in time, end at the same point in time, or have the same duration.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store data; and
a circuit configured to (i) analyze a warp field to select one of a plurality of read modes as a current read mode that reduces a memory bandwidth, (ii) generate one or more read requests for fetching one or more rectangular regions of an input image containing data from said memory based on said current read mode, (iii) generate one or more tags defining how the one or more rectangular regions of the input image are to be stored in one or more local buffers based on said current read mode, and (iv) generate an output image by filtering said data stored in said one or more local buffers with said warp field, wherein at least one of said read modes communicates skip information by including (i) an initial start location of an initial rectangular region to return, (ii) a count value indicating a number of rectangular regions to return, (iii) a displacement value indicating a default displacement between start locations of each of the number of rectangular regions to return, and (iv) a number of flag values indicating whether to modify said default displacement for a respective rectangular region, as part of the read requests to allow a plurality of non-uniformly displaced rectangular regions to be fetched with a single read request.

2. The apparatus according to claim 1, wherein (i) said circuit comprises a plurality of local buffers and (ii) said circuit is further configured to select among said local buffers to store said data based on said current read mode prior to generation of said output image.

3. The apparatus according to claim 1, wherein a first of said read modes issues a first read request to said memory that returns a single one of said rectangular regions.

4. The apparatus according to claim 3, wherein a second of said read modes issues a second read request to said memory that returns a plurality of said rectangular regions that have a uniform displacement between each other along at least one dimension of said input image.

5. The apparatus according to claim 4, wherein a third of said read modes issues a third read request to said memory that returns said plurality of said rectangular regions that have said non-uniform displacement between each other along the at least one dimension of said input image.

6. The apparatus according to claim 1, wherein a first read request issued in a first of said read modes, a second read request issued in a second of said read modes, and a third read request issued in a third of said read modes each comprise (i) said initial location of said initial rectangular region to return and (ii) a size of said initial rectangular region.

7. The apparatus according to claim 6, wherein said second read request and said third read request each further comprises (i) said count value indicating said number of said rectangular regions to return and (ii) said displacement value indicating said default displacement between starting locations of neighboring ones of said rectangular regions to return.

8. The apparatus according to claim 7, wherein (i) said number of flag values comprises at least one string of flag values corresponding to at least one dimension of said input image, (ii) each of said flag values comprises a bit corresponding to one of said respective rectangular regions to return, and (iii) each bit is added to a corresponding coordinate of said starting location of a corresponding respective rectangular region.

9. The apparatus according to claim 8, wherein said number of flags comprises two strings of flags that correspond to two dimensions of said input image.

10. The apparatus according to claim 1, wherein said memory and said circuit are configured as part of a computer vision system.

11. A method for multi-mode warp filtering, comprising the steps of:
analyzing a warp field to select one of a plurality of read modes as a current read mode that reduces a memory bandwidth;
generating one or more read requests to fetch one or more rectangular regions of an input image containing data from a memory based on said current read mode, wherein at least one of said read modes communicates skip information by including (i) an initial start location of an initial rectangular region to return, (ii) a count value indicating a number of rectangular regions to return, (iii) a displacement value indicating a default displacement between start locations of each of the number of rectangular regions to return, and (iv) a number of flag values indicating whether to modify said default displacement for a respective rectangular region, as part of the read requests to allow a plurality of non-uniformly displaced rectangular regions to be fetched with a single read request;
generating one or more tags defining how the one or more rectangular regions of the input image are to be stored in one or more local buffers based on said current read mode; and
generating an output image by filtering said data stored in said one or more local buffers with said warp field.

12. The method according to claim 11, further comprising the step of:
selecting among a plurality of local buffers to store said data based on said current read mode prior to generation of said output image.

13. The method according to claim 11, wherein a first of said read modes issues a first read request to said memory that returns a single one of said rectangular regions.

14. The method according to claim 13, wherein a second of said read modes issues a second read request to said memory that returns a plurality of said rectangular regions that have a uniform displacement between each other along at least one dimension of said input image.

15. The method according to claim 14, wherein a third of said read modes issues a third read request to said memory that returns said plurality of said rectangular regions that have said non-uniform displacement between each other along the at least one dimension of said input image.

16. The method according to claim 11, wherein a first read request issued in a first of said read modes, a second read request issued in a second of said read modes, and a third read request issued in a third of said read modes each comprise (i) said initial location of said initial rectangular region to return and (ii) a size of said initial rectangular region.

17. The method according to claim 16, wherein said second read request and said third read request each further comprise (i) said count value indicating said number of said rectangular regions to return and (ii) said displacement value indicating said default displacement between starting locations of neighboring ones of said rectangular regions to return.

18. The method according to claim 17, wherein (i) said number of flag values comprises at least one string of flags corresponding to at least one dimension of said input image, (ii) each of said flag values comprises a bit corresponding to a respective one of said rectangular regions to return, and (iii) each of said bits is added to a corresponding coordinate of one of said starting locations of said rectangular regions to return.

19. The method according to claim 11, further comprising the step of:
selecting a new current read mode from said plurality of read modes in response to each new processing granularity.

20. The method according to claim 11, wherein the steps are implemented in a computer vision system.

\* \* \* \* \*